(12) United States Patent
Schroth

(10) Patent No.: US 6,870,856 B1
(45) Date of Patent: Mar. 22, 2005

(54) CIRCUIT FOR TRANSMITTING PLESIOCHRONOUS SIGNALS IN A SDH SYSTEM

(75) Inventor: Volkmar Schroth, Nuremberg (DE)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/228,101

(22) Filed: Jan. 11, 1999

(30) Foreign Application Priority Data

Jan. 12, 1998 (DE) .......................................... 198 00 619

(51) Int. Cl.[7] .............................. H04J 3/16; H04J 3/22; H04J 3/06; H04J 3/02
(52) U.S. Cl. ........................ 370/466; 370/503; 370/537
(58) Field of Search ................................ 370/466, 358, 370/400, 401, 498, 503; 538/537–544

(56) References Cited

U.S. PATENT DOCUMENTS

| | | | | |
|---|---|---|---|---|
| 4,542,500 A | * | 9/1985 | Jean-Claude | 370/506 |
| 4,667,324 A | * | 5/1987 | Graves | 370/505 |
| 5,062,105 A | * | 10/1991 | McKnight et al. | 370/538 |
| 5,319,637 A | * | 6/1994 | Taniguchi et al. | 370/522 |
| 5,940,456 A | * | 8/1999 | Chen et al. | 370/516 |
| 6,021,112 A | * | 2/2000 | Sugawara | 370/222 |
| 6,094,442 A | * | 7/2000 | Okamoto et al. | 370/506 |
| 6,396,853 B1 | * | 5/2002 | Humphrey et al. | 370/535 |

\* cited by examiner

*Primary Examiner*—Frank Duong
*Assistant Examiner*—Kevin C. Harper

(57) ABSTRACT

A circuit arrangement for a reception part of an SDH transmission system for transmitting plesiochronous signals contains input channels assigned to these signals which are connected to a clock synchronizer for the adaptation of the plesiochronous signals to a common processing clock. The clock synchronizer is followed by a multiplexer, to the output of which a reception processor is connected for the transformation of a plesiochronous signal into a synchronous signal for an SDH transmission channel. A circuit arrangement for a transmission part of the SDH transmission system contains a multiplexer, to the output of which a transmission processor is connected for the conversion of a transmitted synchronous signal into a plesiochronous signal. Using a desynchronizer following the transmission processor, the plesiochronous signal clocks are recovered, and the plesiochronous signals are issued to the output channels assigned to them.

3 Claims, 6 Drawing Sheets

CIRCUIT FOR TRANSMITTING PLESIOCHRONOUS SIGNALS IN A SDH SYSTEM

BACKGROUND OF THE INVENTION

1. Field of the Invention

The invention concerns a circuit arrangement for a reception part of an SDH (Synchronous Digital Hierarchy) Transmission System and a circuit arrangement for a transmission part of an SDH transmission system.

2. Description of the Prior Art

SDH is a special transmission hierarchy for the transmission of digital signals. By means of the synchronous digital hierarchy it is possible to transmit plesiochronous signals uniformly. At that several binary signals are called plesiochronous if their bit rates are nominally equal, but in fact are able to deviate within a given tolerance from the nominal value. It is possible to transmit several plesiochronous signals via the time-multiplex process by means of one transmission channel (SDH transmission channel). Before the plesiochronous signals are combined by a multiplexer (SDH multiplexer) and before they can be transmitted on the SDH transmission channel, they must be brought in the reception part to the same bit rate. The adaptation of the bit rates occurs in the reception part, especially through bit- or pointer-stuffing actions. In the transmission portion the plesiochronous signals are regained from the synchronous signal stream and placed together with their associated plesiochronous signal clocks on the output channels assigned to them.

For the synchronization of the parallel plesiochronous signal streams it is conceivable to realize the reception part through parallel circuits, in which parallel processing of the plesiochronous signals occurs. In an analogous manner it is also possible that the signals transmitted in the SDH transmission channel be processed in parallel circuits into parallel plesiochronous signals. A disadvantage is here the fact that the expenses for the circuit technology increase strongly with the rising number of input channels assigned to the reception part or output channels assigned to the transmission part.

SUMMARY OF THE INVENTION

Thus it is the purpose of the invention to indicate a circuit arrangement for a reception part or for a transmission part of an SDH transmission system, which makes it possible, at a low complexity and at small technical expenditure, to transmit plesiochronous signals in an SDH transmission system.

The circuit arrangement for the reception part of the SDH transmission system contains several input channels assigned to the plesiochronous signals and a clock synchronizer. The input channels are connected to the input side of the clock synchronizer. The clock synchronizer adapts the plesiochronous signals received in parallel to a common processing clock. The clock synchronizer is followed by a multiplexer (reception multiplexer), to the output of which is connected a reception processing means. This reception processing means converts the plesiochronous signals into synchronous signals for an SDH transmission channel.

It is thereby possible to use one-and-the-same reception processing means in the time multiplex process repeatedly. In this manner it is possible to process several input channels by the same reception processing means. For this purpose the circuit arrangement of the reception part is operated in a number of time slices corresponding to the number of input channels. In each time slice only one channel is connected to the input of the reception processing means. Thereby the clock adaptation guarantees through the clock synchronizer the orderly course of the time multiplex process.

The technical expenditure for the realization of the reception part of an SDH transmission system thus remains small, even at a large number of parallel input channels, and is thus cost-effective.

The same advantages are obtained by the circuit arrangement according to the invention for the transmission part of an SDH transmission system through the fact that the signals already transmitted via of the SDH transmission channel by the time multiplex method are processed into plesiochronous signals in the same reception processing means. In order to realize the time multiplex method in the transmission part, a multiplexer (transmission multiplexer) is provided, to the output of which the transmission processing means is connected. This transmission processing means converts the transmitted synchronous signals into plesiochronous signals. To retrieve the plesiochronous signal clocks of the plesiochronous signals a desynchronizer is connected to the output side of the transmission processing unit. This desynchronizer issues the plesiochronous signals to their assigned output channels. The possibility of carrying out, at that, many processing steps of the signals by the time multiplex method is guaranteed by the connection of the desynchronizer to the output side of the transmission processing means.

In a preferred form of execution the clock synchronizer contains a number of buffer memories corresponding to the number of input channels. The signals are written into these buffer memories with their plesiochronous signal clocks, while the parallel signals show at the output of the buffer memory a mutually synchronous processing clock. Thereby the clock synchronization of the plesiochronous signals, required before the time multiplex process, can be realized through ready-made constituent parts at favorable cost.

In an advantageous elaboration, a demultiplexer (reception demultiplexer) follows the reception processing means. Thereby it is possible to connect the circuit arrangement for the reception part without additional technical expenditure to an interface that is connected before the SDH transmission channel. At this interface there is e.g. an SDH multiplexer which receives the synchronized signals from the reception demultiplexer and retransmits them on the SDH transmission channel. It is thereby possible to connect the circuit arrangement for the receiving side without any special technical expenditure to an already provided interface of the SDH transmission channel. This, in turn, raises the universal insertability of the circuit arrangement.

In order to keep the technical expenditure for the transmission part especially low, in a preferred form of execution the transmission processing means at the output end is connected to a demultiplexer (transmission demultiplexer) contained in the desynchronizer.

In further advantageous forms of execution the reception processing means and/or the transmission processing means and/or the desynchronizer are part of a so-called digital sequential circuit, which is operated in a number of time slices corresponding to the number of channels. "Digital sequential circuit" here stands for a digital circuit arrangement for carrying out logical operations with the additional capability of storing individual variable states. Such a sequential circuit is also called a Finite State Machine (FSM) and contains a purely combinatorial logic part—a so-called "combinatorial circuit"—as well as a state memory, in which the present state of the sequential circuit is stored. This state memory is also called a state register and is mostly realized with flip-flops. The present state of the sequential circuit (system state) is represented by a bit sample or a state vector, the value of which is always stored in the state register for one clock period. This present state of the system is issued in the following clock [period] to the combinatorial logic part and there connected by logical combination of the input variables to output variables and to a new state of the sequential circuit (state of the follow-up system, following system state). This state of the follow-up system is then loaded anew into the state memory and issued in the following clock to the combinatorial logic part. Such a sequential circuit is explained in detail, for example, in the textbook "Halbleiter Schaltungstechnik" [Semiconductor Circuit Technology] by U. Tietze and Ch. Schenk, 5th edition, 1980, pp. 491 ff.

Applied to the circuit arrangement, the digital sequential circuit now contains a multiplicity of channels which are connected to a multiplexer (e.g. reception multiplexer or transmission multiplexer). The output of the multiplexer is followed by the input of a combinatorial circuit to which an addressable state memory is assigned. This latter is designed to store a number of system states, corresponding at least to the number of channels connected to the multiplexer.

This measure makes it possible to utilize one-and-the-same combinatorial circuit several times by the time multiplex method. To this end, the digital sequential circuit is operated in a number of time slices corresponding to the number of channels. In each time slice there is only one channel connected to the input of the combinatorial circuit. The state of the system belonging to this channel is read from the state memory. In the combinatorial circuit the output signal (output variables) and the following system state are generated, which is deposited anew in the state memory. In this manner it is possible to process several channels in one-and-the-same combinatorial circuit. Thus only a small expenditure of circuitry is needed for this sequential circuit, because the combinatorial circuit containing the combinatorial logic can be used repeatedly in time multiplex.

Digital sequential circuits of this kind for the processing of parallel signals thus facilitate the construction of the receiving part and the transmitting part with minor complexity and with minor technical expenditure. At that, compared to previously known sequential circuits, the additional technical expenditure for the state memory is small enough to be negligible in comparison to the savings effect through the multiple use of the same combinatorial logic (combinatorial circuit) in the time multiplex method.

Furthermore, in a preferred form of execution, there is provided for the issuance of the output variables of the combinatorial circuit a first output, which is followed by a first demultiplexer (especially a reception or transmission demultiplexer). By this measure it is possible to read out the states of the combinatorial circuit present in the individual time slices. In an appropriate manner, a second output is provided for the output of the system state, with a second demultiplexer being connected before it. This makes it possible to access the respective present system states in the individual time slices.

So as to be able to carry out a number of processing functions within one component part, to good advantage several combinatorial circuits, each one with an associated state memory, are connected in series. It is thereby possible in a simple way by circuit technology to integrate in the reception processing unit and/or in the transmission processing unit and/or in the desynchronizer several processing functions for processing the signals.

DETAILED DESCRIPTION OF THE INVENTION

Figure 1:
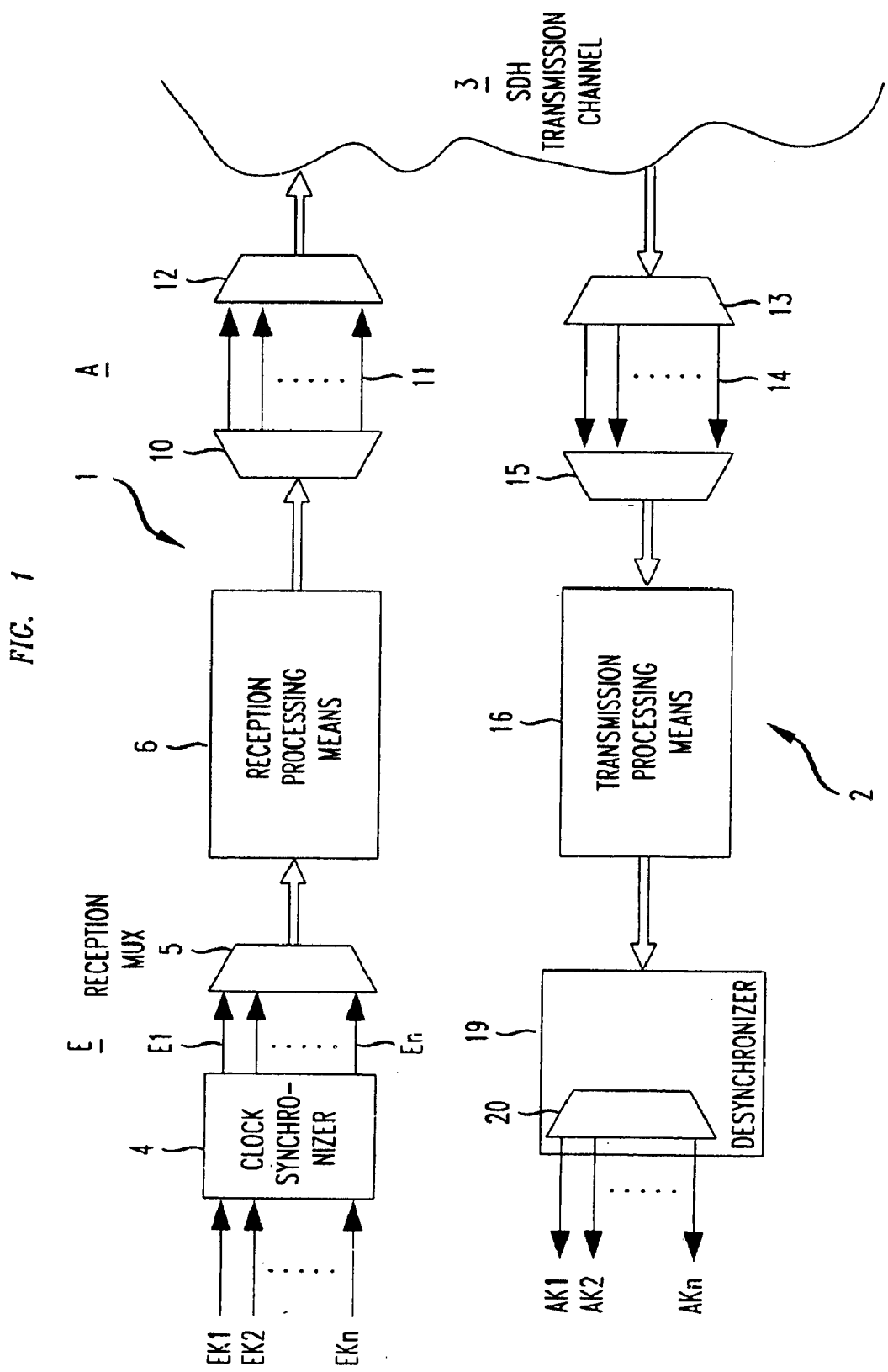
FIG. 1 in schematic representation a reception part and a transmission part for an SDH transmission system, FIG. 2 in a wiring diagram a circuit arrangement for the receiving part, FIG. 3 in a wiring diagram a circuit arrangement for the transmission part, FIG. 4 in a wiring diagram a digital sequential circuit operating in the time multiplex method, FIG. 5 a digital sequential circuit according to FIG. 4 as an 8 channel 16 bit counter, FIG. 6 the course in time of the control signals required for controlling the 8 channel 16 bit counter, and FIG. 7 a further advantageous form of execution of a digital sequential circuit operating in the time multiplex method.

According to FIG. 1, an SDH transmission system contains a circuit arrangement for a receiving part 1 and a circuit arrangement for a transmission part 2. The reception part 1 and the transmission part 2 are connected via suitable interfaces to an SDH transmission channel 3 shown only schematically. By means of the SDH transmission system shown in FIG. 1 parallel plesiochronous signals are received, processed in the reception part 1, and sent out as "synchronized" signals on the SDH transmission channel 3. After the transmission of the "synchronized" signals, the plesiochronous structure of the signals is reconstituted in the transmission part 2 before they are issued by the transmission part 2 to the parallel output channels AK1, AK2. . . .

The reception part 1 receives at its input side several parallel plesiochronous signals. To this end, several mutually parallel input channels EK1, EK2, . . . EKn are arranged. These input channels EK1, EK2, . . . EKn are connected to a clock synchronizer 4. The clock synchronizer 4 receives the plesiochronous signals and adapts them to a common processing clock. Through this the plesiochronous signals are issued by the clock synchronizer 4 at equal frequencies. This frequency equality is prerequisite for the plesiochronous signals to be received by a reception multiplexer 5 following the clock synchronizer 4 and to be processed further by the time multiplex method. To this end a reception processing means 6 is connected to the output of the reception multiplexer 5. In this reception processing means 6 the plesiochronous signal issued by the reception multiplexer 5 is processed. Depending on the particular application, it is possible that there are contained in the reception processing means 6 e.g. various plesiochronous function blocks as well as a synchronizer 8 and a mapper 9. A thus-elaborated reception processing means 6 is shown in detail in FIG. 2. In a further form of execution, not shown here, it is possible to dispense in part or completely with plesiochronous function blocks, so that the reception processing means 6 essentially only contains just one synchronizer 6 and one mapping unit 9.

In the synchronizer 8 and in the mapping unit 9 the conversion of the plesiochronous signal stream into the synchronous signal stream occurs. To this end the necessary bit- or byte-stuffing actions (pointer actions) are determined, which are then mapped in the mapping unit 9 into the synchronous signal stream. In other words, the signals on the output lines of a reception demultiplexer 10 following a reception processing means 6 are synchronous with regard to the clock as well as also to the bit rate. The output of the reception demultiplexer 10 is connected via an interface 11 not shown here in detail to the input of a so-called SDH multiplexer 12. By means of this SDH multiplexer 12 the signal stream synchronized by the reception-processing means 6 is inserted by the reception-processing means 6 into a synchronous frame of a higher bit rate (e.g. STM-1).

In the transmitting part, i.e. on the side of the transmission part 2, the plesiochronous signals originally on the input channels EK1, EK2. . . EKn are regained from the transmitted synchronous data stream and are issued to the parallel output channels AK1, AK2, . . . AKn. For this purpose a so-called SDH demultiplexer 13 is connected to the SDH transmission channel 3. There, from the higher bit rate signal stream (e.g. STM-1), that signal stream is taken which has been generated before its transmission by the reception processing means 6. The SDH demultiplexer 13 is connected via a transmission interface 14 (not shown in detail) to a transmission multiplexer 15. The output of the transmission multiplexer 15 is, in turn, connected to a transmission processing means 16. By the transmission processing means 16 the "synchronized" transmitted signal stream is, in turn, transformed into plesiochronous signals. To this end the transmission processing means 16 contains e.g. among other things a demapping unit (demapper) 17 and, if the case be, various plesiochronous function blocks. Functions of that type are contained according to FIG. 1 in the transmission processing means 16 according to FIG. 3.

Depending on the case of application, the transmission processing means 16 can contain various functions. Thus the transmission processing means 16 can e.g. contain also just a demapping unit 17, while further plesiochronous functions are absent By means of the demapping unit 17 there occurs a division of the signal stream into plesiochronous content, stuffing information and other overhead information. Here, too, as in the receiving part 1, the processing occurs by the time multiplex method.

The plesiochronous information bits processed by the transmission processing means are conducted to a desynchronizer 19. This desynchronizer 19 is connected following the transmission processing means 16. At the input of the desynchronizer 19 the plesiochronous signal clocks of the plesiochronous signals are not yet present. In the desynchronizer 19 now for each output channel AK1, AK2, . . . AKn that plesiochronous signal clock is recovered which had corresponded to the original plesiochronous signal stream at the respective input channels EK1, EK2, . . . EKn. To this end, the plesiochronous signal streams are, emitted on the respectively allocated output channels AK1, AK2, . . . AKn. For this purpose the desynchronizer 19 contains a transmission demultiplexer 20, to the output of which the output channels AK1, AK2, . . . AKn are connected.

For orderly course the constituent parts or functional units of the receiving end and of the transmitting end are electrically wired to a control device not shown in FIG. 1, and as necessary, to further functional units. The reception processing means 6 and the transmission processing means 16 can be variously equipped according to FIG. 1, depending on the plesiochronous signals to be transformed, and are adapted to the structure of the plesiochronous signals to be processed.

Figure 2:
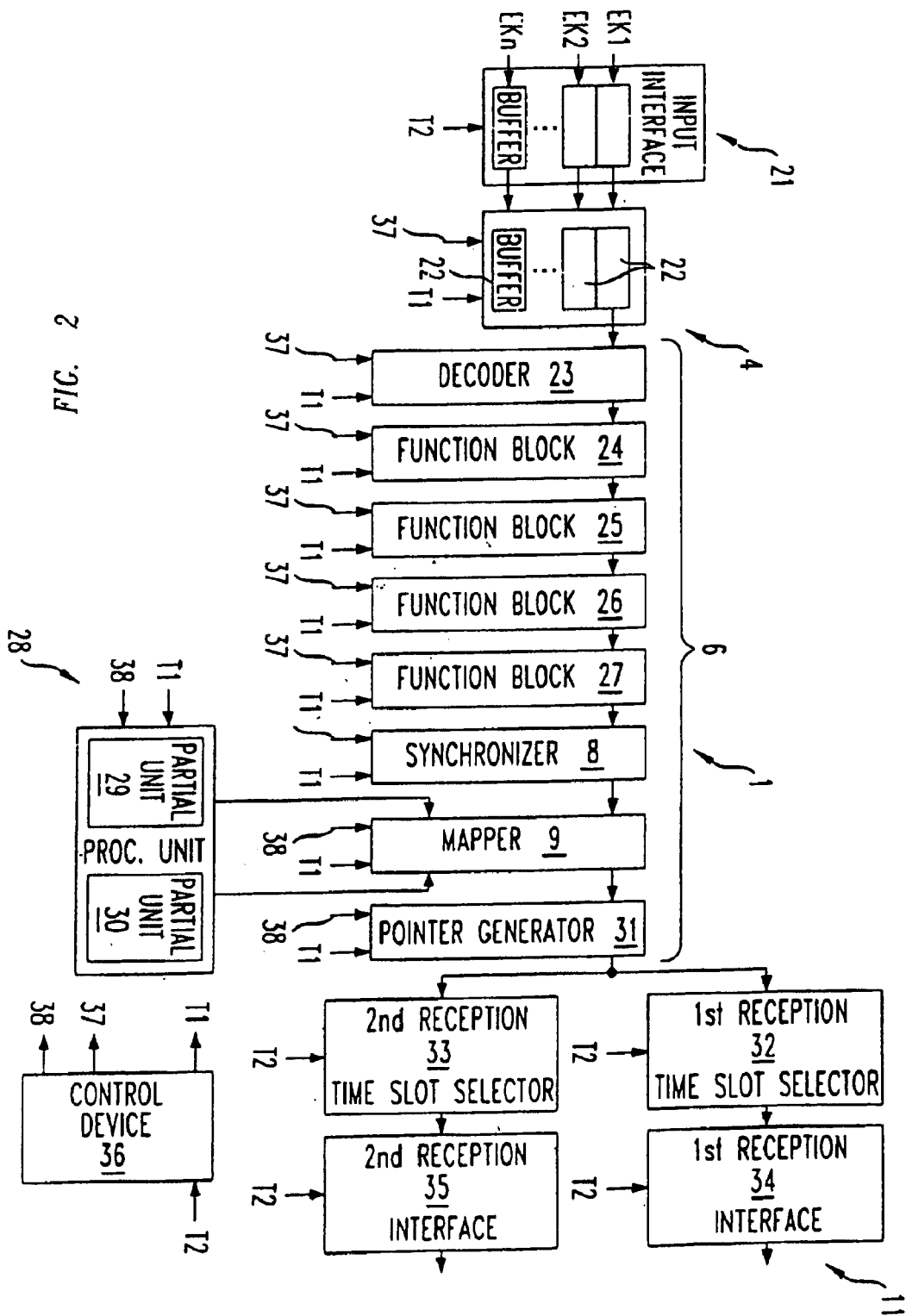

FIG. 2 represents an example of execution of a reception part 1 which is particularly suited for the processing of plesiochronous signals with a bit rate of 2 Mbit/s. At that, the input channels EK1, EK2, . . . EKn are connected via an input interface 21 to the clock synchronizer 4. The clock synchronizer 4 contains a number of buffer memories 22 corresponding to the number n of input channels EK. Into these buffer memories 22 are written the plesiochronous signals with the signal clocks on which they are based. With a processing clock that is higher in comparison to the plesiochronous signal clocks, the signals are read from the buffer memories 22. If a buffer memory 22 becomes empty, stuffing bits are inserted, which are marked—i.e., these informationless bits are not considered in the further processing in the reception part 1 and serve only for the clock adaptation of the plesiochronous signals to a common "synchronous" processing clock.

The outputs of the buffer memories 22 are connected to the reception multiplexer 5 not shown in FIG. 2. This reception multiplexer 5 is in turn followed by the first of the several function blocks connected in series that are contained in processing means 6. This first function block is designated as decoder 23. Occurring there, for example, is the monitoring of the signal streams for loss of signal (TLOS), for replacement patterns (TAIS) and for code errors (TCode). In addition, decoding of the signal (e.g. HDB3-decoding) can occur there. In the four function blocks 24, 25, 26 and 27, connected after the decoder 23, frame synchronization occurs in the case of 2 Mbit/s processing. There it is possible to carry out in the function blocks 24–27 the following functions:

synchronization to the 2 Mbit/s base frames and multiframes (TFRAME), extraction of overhead bits such as e.g. A-Bits, E-Bits, Sa-bits possible masking of individual 64 kbit/s channels, insertion of replacement patterns (TAIS, TAUXP, TFAIS), insertion of overhead bits such as A-bits, E-bits, Sa-bits, and fresh calculation of frame overhead (CRC-4).

In the synchronizer 8 following the functional block 27 are found a buffer memory as well as a bit- and byte-stuffing control to equalize the bit rates. Following the synchronizer 8 is the mapping unit 9. There, with bit stuffing action as necessary, the synchronous transmission frame (C-12) is formed. In addition, with the help of a processing unit 28, which is connected to the mapping unit 9 and allocated to the reception processing means 6, the SDH overhead information (POH) is determined.

Following the mapping 9 is a pointer generator 31, which creates a pointer to be added to the signal stream. The output of the pointer generator 31 is connected to a two-part demultiplexer unit which comprises a first reception time slot selector 32 and a second reception time slot selector 33. These two reception time slot selectors 32, 33 replace, in the form of execution according to FIG. 2, the reception demultiplexer 10 according to FIG. 1. Correspondingly, the reception interface 11 in FIG. 2 is constructed in two parts and contains a first reception interface 34 for a first data bus and a second reception partial interface 35 for a second data bus. Analogously, the processing unit 28 contains a first partial unit 29 and a second partial unit 30. Here the first partial unit 29 is assigned to the first data bus, and the second partial unit 30 to the second data bus.

For controlling the clock synchronizer 4 and the reception processing means 6 a control device 36 is provided. These components are triggered by the control device 36 with a working clock T1. In addition, the control device 36 is connected via further control lines to the aforementioned structural components. These control lines are symbolically indicated by the control line 37 and the control line 38. In the control device 36 the write-enable signals as well as the write and read addresses for the control of the aforementioned components are generated and issued to the corresponding structural components by means of the control lines 37 or by means of the control lines 38. The control unit 36, in turn, is driven by a working clock T2. In the same manner the input interface 21, the reception time slot selectors 32, 33 and the reception partial interfaces 34, 35 are driven by the working clock T2.

Figure 3:
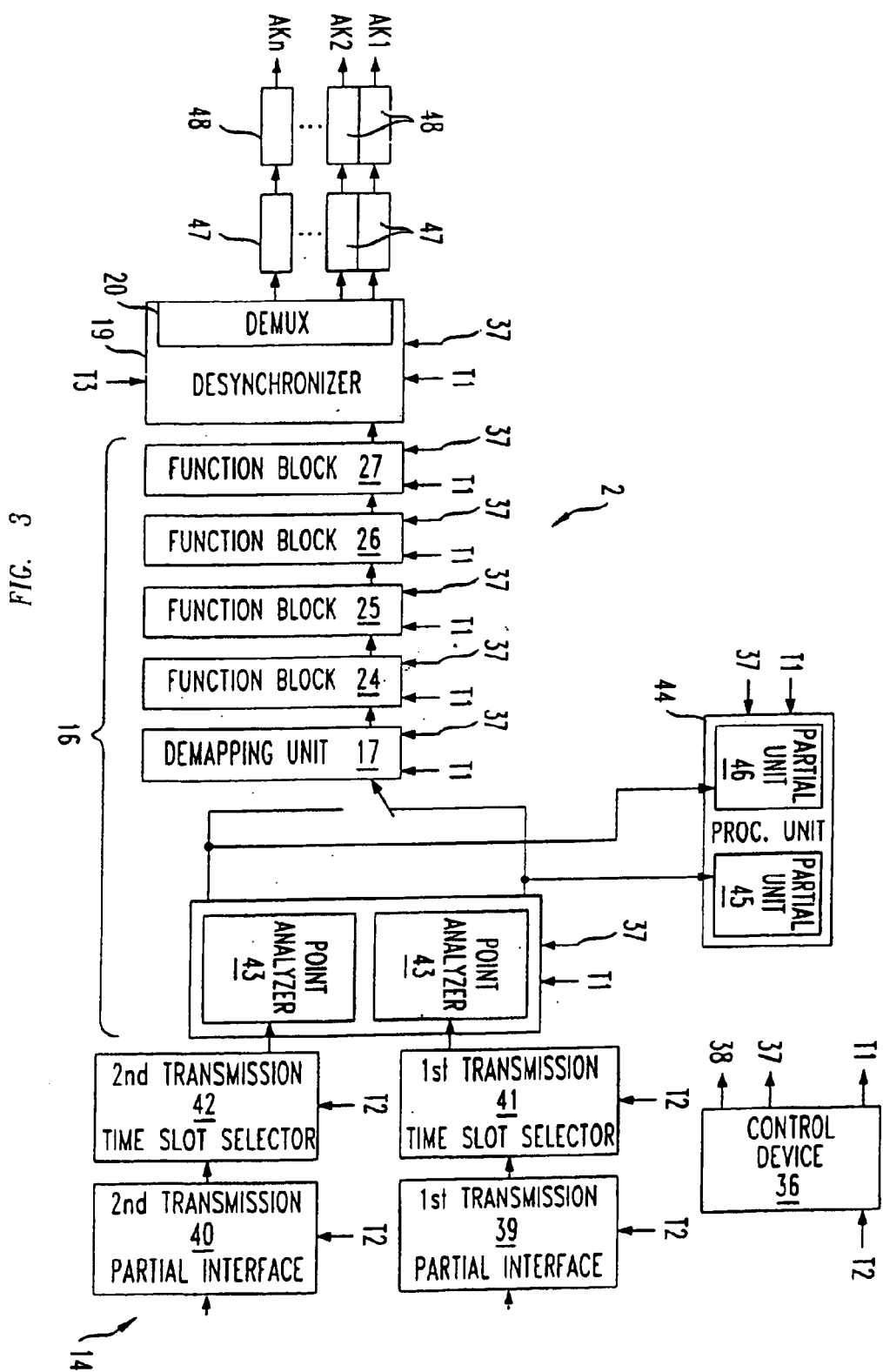

At the transmission side, according to FIG. 3, the transmission interface 14 is likewise split into two and is composed of a first transmission partial interface 39 as well as a second transmission partial interface 40. These two transmission partial interfaces 39, 40 are connected, in analogy to the reception side FIG. 2, to a first transmission time slot selector 41 or a second transmission time slot selector 42. Following these two transmission time slot selectors 41, 42 are two pointer analyzers 43, which have their outputs connected to a processing unit 44 and the demapping unit 17. The processing unit 44 comprises likewise a first partial unit 45 and a second partial unit 46. The pointer analyzers 43, the processing unit 44 and the demapping unit 17 work together and extract the plesiochronous signal stream from the transmitted signal stream. Regarding a plesiochronous signal stream with a 2 Mbit/s bit rate, let the following functions of these structural components be mentioned here as keywords:

Extraction of the VC-12 from the TU-12;
Determination of pointer stuffing events,
Extraction of the overhead of the VC-12 (POH) and extraction of the C-12,
Extraction of the 2 Mbit/s-signal stream from the C-12.

After the demapping unit 17 there occurs in the transmission part 2— analogously to the reception part 1—a frame synchronization in the function blocks 24 to 27, as has been described already based on FIG. 2. Following the last function block 27 is the desynchronizer 19. In the desynchronizer 19, in turn, the plesiochronous signal clocks for each individual output channel AK1, AK2 ... AKn are regained. Inasmuch as the desynchronizer 19 follows the transmission-processing means, it is still possible to process the signals before the desynchronizer 19 in a uniform clock universe of the SDH. This makes possible the processing of the signals between the transmission interface 14 and the desynchronizer 19 by the time multiplex method. All the plesiochronous functions of the transmission part 2 up to the desynchronizer 19 can thus still be operated in the clock universe of the SDH. The overhead information etc., required for the SDH, which is meaningless for the plesiochronous functions, is marked by means of an additional signal. These marking signals fulfill the same purpose as the stuffing marking signals of the reception device and suppress further processing of these marked bits in the plesiochronous functional blocks.

Following the transmission demultiplexer 20 integrated into the desynchronizer 19 are coders 47. Since after the desynchronizer 19 the original signal clock is always again the basis of the individual channels, a coder 47 is required for each channel. Here e.g. occurs a coding of a 2 Mbit/s signal stream into the line code HDB3. Assigned to each coder 47 there is an output interface 48.

By analogy to the reception side according to FIG. 2, most of the component parts arranged on the transmission side are also driven according to FIG. 3 by the first working clock T1. These component parts are connected via the control lines 37 to the control device 36. The two partial transmission interfaces 39, 40, as well as the two transmission time slot selectors 41, 42 are operated by the working clock T2, which is high in comparison to the working clock T1.

With an integration of the large number of complex digital circuits in the reception part 1 and in the transmission part 2, power loss optimization becomes very important. For this reason it is desirable to keep the working clock T1 as low as possible, and to operate as many circuit functions as possible with this low working clock T1. Let this be explained in the following based on 21 parallel plesiochronous signals to be processed at a bit rate of 2 Mbit/s. 21 signals are ⅓ of the capacity of a synchronous STM-1 signal, which is transmitted at a bit rate of 155.52 Mbit/s. Thus 15.52/3 MHz must suffice for 21 signals. In addition the processing is done in parallel into a byte format. From this there follows a further reduction of the working clock T1 by a factor of 8. Therefore, for the processing of 21 signals with a bit rate of 2 Mbit/s, a working clock T1 with a frequency of (155.52/3 MHz)/8=6.48 MHz is required.

Since the circuit contains byte-parallel interfaces on the SDH side, the highest working clock T2 to be processed with is 155.52/8 MHz=19.44 MHz. From this working clock T2 are generated in the control device 36 the working clock T1, the Write-Enable Signals as well as the writing and reading addresses, which are transferred by means of the control lines 37 or by means of the control lines 38. In the case of a completely digital realization of the desynchronizer 19, if the case be, this latter must be operated with a very high working clock T3 of e.g. 64 MHz.

The reception processing means 6 (part of which is also the processing unit 28) can be used repeatedly by the time multiplex method, because the plesiochronous signals to be processed are, after the clock synchronizer 4, of equal frequency. Analogously, it is possible to use repeatedly in the transmission part 2 the transmission processing means 16 (part of which is also the processing unit 44) by the time multiplex method, because the functions of the transmission processing means 16 are operated in a uniform clock universe of the SDH. In addition, starting from the demapping unit 17, invalid data, which serve merely for the frequency adaptation to a higher working clock, are marked invalid and not processed in the function blocks 24 to 27.

With their multiple use by the time multiplex method, the reception processing means 6 and the transmission processing means 16 can be constituent parts of so-called digital sequential circuits which each contain an input E. This input E comprises a number n of mutually parallel channels E1, . . . En. At that this number n corresponds to the number of input channels EK1, EK2, . . . EKn. This has been represented as an example based on the reception part 1 in FIG. 1. The construction of such a digital sequential circuit is explained in the following, based on FIG. 4.

Figure 4:
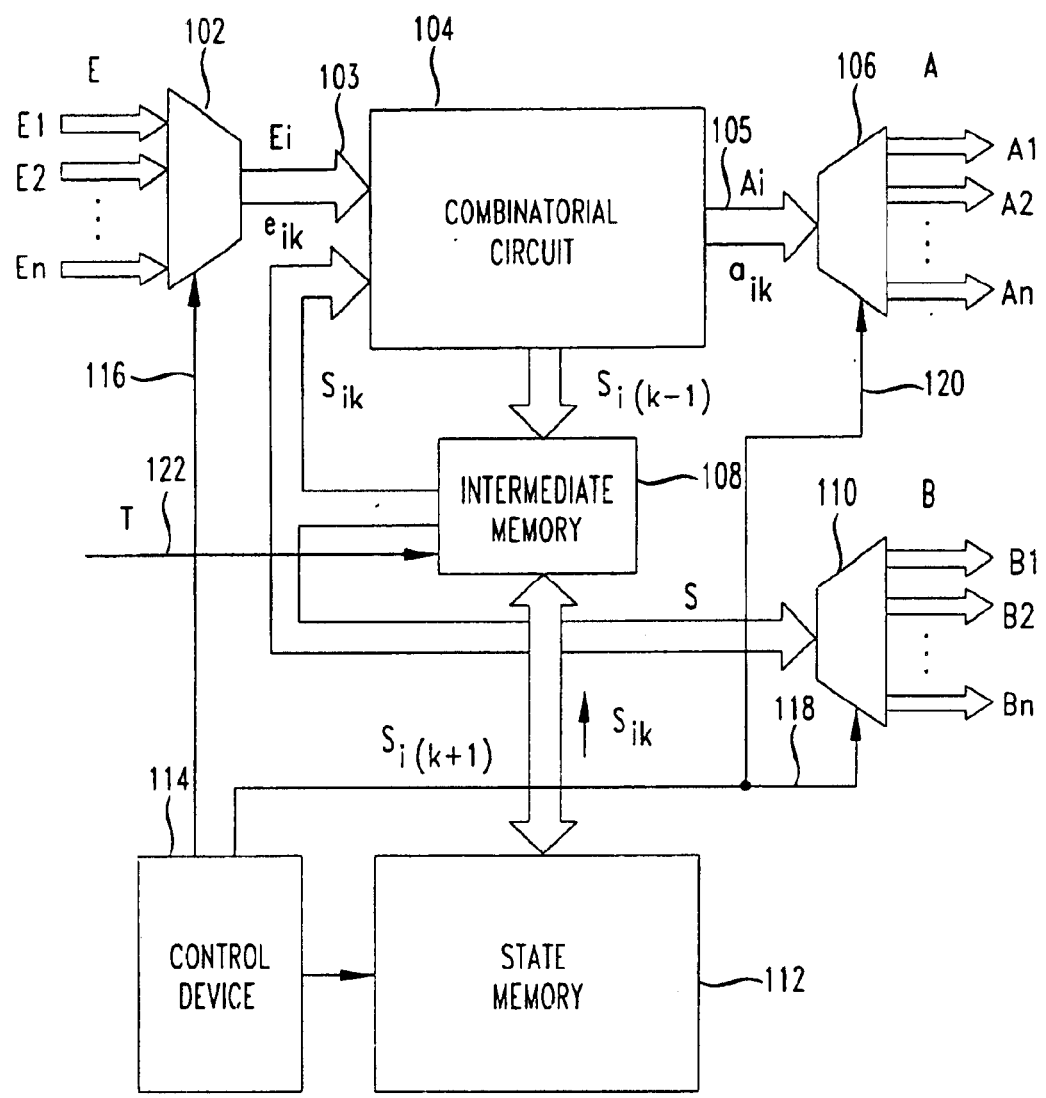

According to FIG. 4 a digital sequential circuit contains an input E, which comprises a number n of mutually parallel channels, E1, E2, . . . En. The input channels E1, E2, . . . En are connected via a multiplexer 102 to the input 103 of a combinatorial circuit 104. One output 105 of the combinatorial circuit 104 is connected to a demultiplexer 106, which distributes the there-extant present output signal $a_{ik}$ (output variables) to one of the output channels A1, A2, . . . An, in the figure to output channel Ai, of a first output A of the digital sequential circuit. The multiplexer 102 switches one of the input channels E1, E2, . . . En, in the illustration input channel Ei with the input signal $e_{ik}$ (input variable), to the input 103 of the combinatorial circuit 104. The input signals $e_{ki}$, as well as the output signals $a_{ik}$ themselves can at that consist of several components, so that also every input channel Ei and every output channel Ai can in turn be composed of several parallel channels together.

To the combinatorial circuit 104 an intermediate memory 108 is assigned. In this intermediate memory 108 the present state of the system $s_{ik}$ is stored. The intermediate memory 108 is connected with its input and with its output to the combinatorial circuit 104. At the input of the combinatorial circuit 104 is the state of the system $s_{ik}$, issued by the intermediate memory 108 and belonging to the present input channel Ei as well as to the present working clock k of this input channel Ei and generated in its previous working clock (k−1). The combinatorial logic of the combinatorial circuit 104 generates, from the present input signal $e_{ik}$ extant at the input channel Ei as well as from the bit sample which represents the state of the system $s_{ik}$, the present output signal $a_{ik}$ belonging to the output channel Ai, as well as a bit sample that returns the state of the follow-up system $S_i(k+1)$ for the input channel Ei. In the example of execution the intermediate memory 108 is, in addition, connected to a second demultiplexer 110, which issues at its output channels B1, B2, . . . Bn the respective associated system states $s_{1k}, s_{2k}, \ldots s_{nk}$ at a second output B.

To the intermediate memory 108 a state memory 112 is associated which contains a number n of memory locations corresponding to the number n of input or output channels Ei or Ai. In the state memory 112 it is thus possible to store n time-successive system states $s_{1k}, s_{2k}, \ldots s_{nk}$. From the state memory 112 the system state $S_{ik}$, obtained from the input channel Ei presently switched through by the multiplexer 102 and to which its working clock k belongs, is loaded into the intermediate memory 108 and forwarded by this latter to the combinatorial logic of the combinatorial circuit 104. The following state $s_i(k+1)$ is subsequently loaded into the intermediate memory 108 and from there deposited into the state memory 112.

To control the multiplexer 102 as well as the demultiplexers 106 and 110 and the state memory 112, a control device 114 is provided which can be identical with the control device 36 according to FIG. 2 and FIG. 3. This control device 114 sees to it that to the input channel Ei, switched through by the multiplexer 102 to the combinatorial circuit 104, the output channels Ai and Bi appertaining to it are switched through, and that via the intermediate memory 108 the present state of the system $S_{ik}$ belonging to this input channel Ei is issued to the combinatorial circuit 104.

To this end the control device is connected via control lines 116, 118, 120 to the multiplexer 102 or to the demultiplexers 106, 110. Via a further control line 122 a clock signal is conducted to the intermediate memory 108, which determines the working clock T of the digital sequential circuit. The clock frequency of the working clock T of the digital sequential circuit is at that larger, by a factor corresponding to the number n, than the clock frequency of the working clock k belonging to an input channel Ei.

Figure 5:
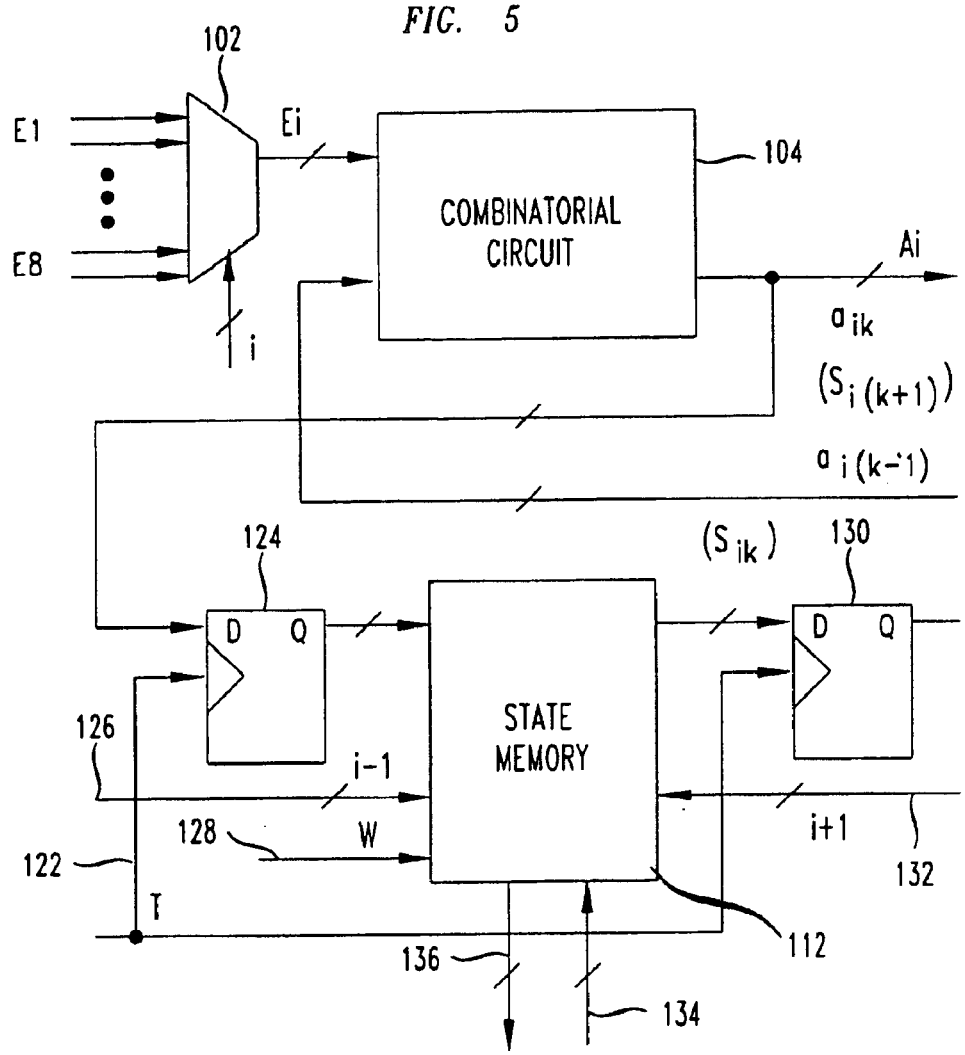

In the example of execution according to FIG. 5, for a digital sequential circuit a 16-bit counter designed in time multiplex for 8 input channels E1 to E8 has been represented. The combinatorial circuit 104 contains for this the combinatorial logic required for 16-bit counter. The input channels in E1 to E8 are connected via the multiplexer 102 to one input of the combinatorial circuit 104. At the output of the combinatorial circuit 104 a data word or output signal $a_{ik}$ with a word length of 16 bits is issued. This output signal $a_{ik}$ is conducted to a flip-flop 124, which, triggered via the clock line 122, stores the 16-bit data word and makes it available at the output Q.

Via an address line 126 a 3-bit writing address is sent to a state memory 112. In this state memory 112, in the example of execution a RAM, it is possible to store eight words, each with a 16 bit word length. At that a writing address is allocated to each channel Ei, with the attached writing address (i−1) corresponding to the input channel Ei switched through at that time by the multiplexer. Via a write-enable control line 128 the writing process is triggered in which the data word at the output Q of the flip-flop 124 is written into the writing address (i−1) extant on the address line 126.

The readout of the state memory 112 occurs via a flip-flop 130 which serves as intermediate memory at the exit end and which forwards the data word extant on its output Q, which represents the present state of the system, to the combinatorial circuit 104. The required reading address for reading out the state memory 112 via the flip-flop 130 is sent over an address line 132.

In the state memory 112 the 8 counter states belonging to the respective input channels E1 . . . E8 are stored. These counter states can be specifically addressed via an address line 134 and issued via a data line 136. Since in this example of execution the system state of the sequential circuit is identical with the output signal, it is possible to read the output signal of the sequential circuit without a demultiplexer directly by access to the contents of the state memory 112.

Figure 6:
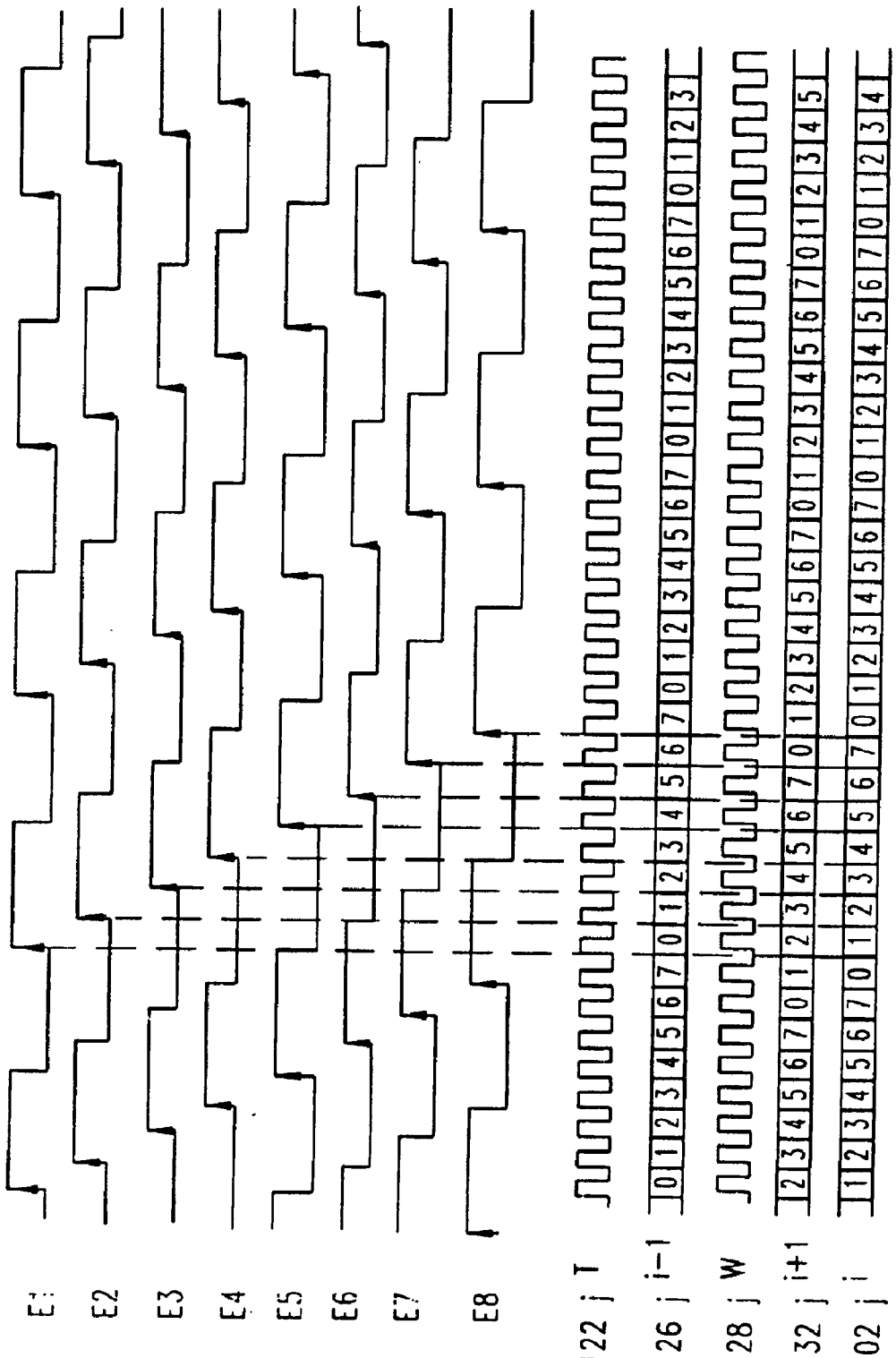

In FIG. 6 the working clocks of the counter of the example of execution according to FIG. 5, belonging respectively to the inputs E1 to E8, are shown. From the figure it can be taken that the working clock T of the digital sequential circuit amounts to eight times the working clock k of the counter corresponding respectively to the individual channels E1 to E8. In the lower-most line of the illustration is indicated the temporal sequence of the address i always extant at the multiplexer 102. Corresponding to this address the input channel Ei (the address 0 here corresponds to channel E8) is switched through by the multiplexer 102 to the combinatorial circuit 104.

The data word $a_{ik}$ extant at the output of the combinatorial circuit 104 is written via the write-enable-clock signal W under the address (i−1) and represents the state of the follow-up system $s_{i(k-1}$ of the counter belonging to the input channel Ei in the next working clock cycler (k+1). The data word $a_{(k-1)}$ representing the previous state of the follow-up system $s_{ik}$ is found in the state memory under the address (i+1). Based on the flip-flops arranged on the input and output sides of the state memory there results a difference between the reading address and the writing address of 2. If the flip-flop at the output is absent, the difference between writing and reading addresses can be reduced to 1. If the flip-flop at the input end is also absent, it would be necessary within one clock cycle to read out from an address and write into the same address. This is possible through suitable control of the state memory 112, so that the intermediate memory at the input end, in the example of execution according to FIG. 5 the flip-flop 124, can be omitted.

The reception processing means 6 contains in one form of execution at least one combinatorial circuit 104 and a state memory belonging to this combinatorial circuit 104, as well as, if the case be, further constituent parts of the digital sequential circuit according to FIG. 4 or FIG. 5. At that the reception multiplexer 5 corresponds to multiplexer 102 according to FIG. 4, while the reception demultiplexer 10 corresponds to the first demultiplexer 106 according to FIG.

4. Analogously it is also possible that transmission processing means 16 and/or the desynchronizer 19 be constituted by a digital sequential circuit or by constituent parts of it. There the transmission multiplexer 15 corresponds to multiplexer 102 according to FIG. 4, while transmission demultiplexer 20 corresponds to the first demultiplexer 106 according to FIG. 4. Also the processing units 28, 44 can be realized by digital sequential circuits or by constituent parts thereof.

Figure 7:
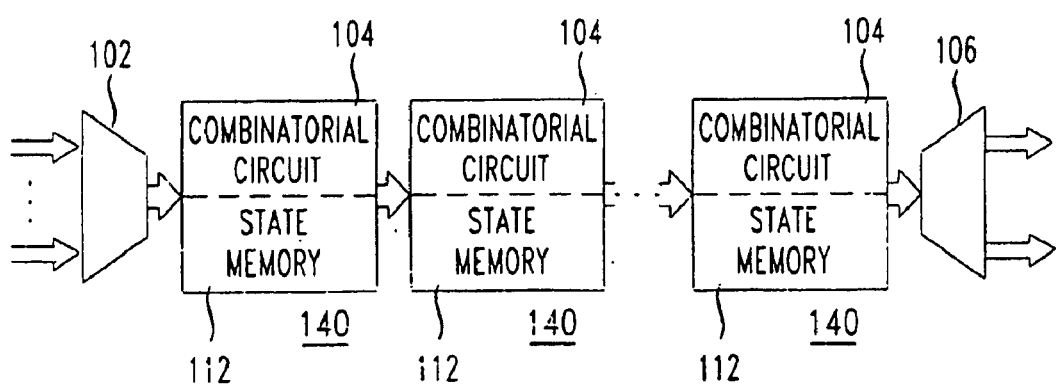

For complex cases of application, it is, according to FIG. 7, also possible to cascade, i.e. to arrange sequentially, several basic units 140 containing at least the combinatorial circuit 104 and the state memory 112. In this case of application the multiplexer and the demultiplexer structures are omitted for the inserted basic units 140.

In a case of application, such a base unit 140 is always contained in the individual functional units 8, 9, 23, 24, 25, 26, 27, 29, 30, and 31 according to FIG. 2 and in the functional units 17, 19, 24, 25, 26, 27, 43, 45, and 46 according to FIG. 3. At that the base unit 140, depending on the respective functional unit, is combined as necessary with further structural components of the digital sequential circuit according to FIG. 4 and FIG. 5.

List of Reference Symbols
E input
E1, E2, En input channel
EK1, EK2, . . . EKn input channel
A first output
A1, A2, An output channel
AK1, AK2, AKn output channel
B second output
B1, Bn output channel
$e_{ik}$ input signal
$a_{ik}$ output signal
$S_{ik}$ system state
T working clock
T1 first working clock
T2 second working clock
T3 working clock
k working clock
i address
n number of channels
1 reception part
2 transmission part
3 SDH transmission channel
4 clock synchronizer
5 reception multiplexer
6 reception processing means
8 synchronizer
9 mapping unit
10 reception demultiplexer
11 reception interface
12 SDH multiplexer
13 SDH demultiplexer
14 transmission interface
15 transmission multiplexer
16 transmission processing means
17 demapping unit
19 desynchronizer
20 transmission demultiplexer
21 input interface
22 buffer memory
23 decoder
24 function block
25 function block
26 function block
27 function block
28 processing unit
29 first partial unit
30 second partial unit
31 pointer generator
32 first reception time slot selector
33 second reception time slot selector
34 first reception partial interface
35 second reception partial interface
36 control device
37 control line
38 control line
39 first transmission partial interface
40 second transmission partial interface
41 first transmission time slot selector
42 second transmission time slot selector
43 pointer analyzer
44 processing unit
45 first partial unit
46 second partial unit
47 coder
48 output interface
102 multiplexer
103 input
104 combinatorial circuit
105 output
106 first demultiplexer
108 intermediate memory
110 second demultiplexer
112 state memory
114 control device
116 control line
118 control line
120 control line
122 clock line
124 flip-flop
126 address line
128 write-enable control line
130 flip-flop
132 address line
134 address line
136 data line
140 basic unit

The invention claimed is:

1. A circuit arrangement for a reception part of an SDH (=Synchronous Digital Hierarchy) transmission system for transmitting plesiochronous signals, comprising:

a clock synchronizer receiving the plesiochronous signals through a plurality of input channels allocated to the plesiochronous signals and adapting the received plesiochronous signals to a common processing clock, the clock synchronizer including a plurality of buffer memories corresponding to the plurality of input channels for writing in the plesiochronous signals with their plesiochronous signal clock, and for reading out the signals with a synchronous processing clock;

a reception multiplexer for receiving the signals with the synchronous processing clock;

a reception processing means connected at an output of the reception multiplexer for transforming a plesiochronous signal into a synchronous signal for an SDH transmission channel;

a demultiplexer following the reception-processing means;

a transmission multiplexer, at the output of which a transmission processing means for transforming a transmitted synchronous signal into a plesiochronous signal is connected; and a desychronizer following the transmission processing means for recovery of transformed plesiochronous signal clocks of the transformed plesiochronous signals and to issue the transformed plesiochronous signals to a plurality of output channels.

2. The circuit arrangement of claim 1, wherein the transmission processing means is connected to a transmission demultiplexer contained in the desynchronizer.

3. The circuit arrangement of claim 1, wherein the reception processing means comprises:
   a synchronizer for equalizing the bit rates of the plesiochronous signal; and
   a mapper for mapping the equalized plesiochronous signal to provide the synchronous signal.

* * * * *